US012123370B2

(12) United States Patent
Simoneau et al.

(10) Patent No.: US 12,123,370 B2
(45) Date of Patent: Oct. 22, 2024

(54) ROTARY ENGINE SHIM DESIGN FOR FLOATING SIDE PLATES

(71) Applicant: Pratt & Whitney Canada Corp., Longueuil (CA)

(72) Inventors: Jean-Philippe Simoneau, Saint-Constant (CA); Johnny Vinski, Chateauguay (CA); David Gagnon-Martin, Longueuil (CA); Sebastien Bolduc, Saint-Bruno-de-Montarville (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 0 days.

(21) Appl. No.: 18/118,975

(22) Filed: Mar. 8, 2023

(65) Prior Publication Data

US 2024/0301839 A1 Sep. 12, 2024

(51) Int. Cl.
*F02F 11/00* (2006.01)
*F02B 55/00* (2006.01)
(Continued)

(52) U.S. Cl.
CPC ............ *F02F 11/007* (2013.01); *F02B 55/00* (2013.01); *F02B 55/08* (2013.01); *F02B 55/10* (2013.01); *F04C 29/04* (2013.01); *F02B 2053/005* (2013.01); *F02F 7/007* (2013.01); *F04C 2230/602* (2013.01); *F04C 2240/80* (2013.01);
(Continued)

(58) Field of Classification Search
CPC ......... F02F 11/007; F02F 7/007; F02B 55/00; F02B 55/08; F02B 55/10; F02B 2053/005; F04C 29/04; F04C 2230/602; F04C 2240/80; F04C 2240/801; F05C 2201/90
See application file for complete search history.

(56) References Cited

U.S. PATENT DOCUMENTS

| | | | | |
|---|---|---|---|---|
| 3,173,406 A | | 3/1965 | Campos | |
| 3,193,187 A | * | 7/1965 | Jones | F01C 1/22 418/60 |

(Continued)

FOREIGN PATENT DOCUMENTS

| | | | | |
|---|---|---|---|---|
| DE | 102014017849 A1 | | 6/2016 | |
| JP | S6069205 A | * | 4/1985 | |

(Continued)

OTHER PUBLICATIONS

English Machine Translation of JPS6069205A via USPTO Fit Database (Year: 1985).*

(Continued)

*Primary Examiner* — Dominick L Plakkoottam
*Assistant Examiner* — Paul W Thiede
(74) *Attorney, Agent, or Firm* — Carlson, Gaskey & Olds, P.C.

(57) ABSTRACT

A rotary internal combustion engine includes a rotor housing having a peripheral wall circumscribing a rotor cavity and a rotor disposed within the rotor cavity. A side housing is secured to the rotor housing and a plate defines a seal running surface for the rotor. The plate is disposed between a portion of the side housing and the rotor housing and at least one shim is disposed between the plate and the side housing for spacing the plate apart from contact with the side housing.

15 Claims, 6 Drawing Sheets

(51) Int. Cl.

| | |
|---|---|
| ***F02B 55/08*** | (2006.01) |
| ***F02B 55/10*** | (2006.01) |
| ***F02F 7/00*** | (2006.01) |
| ***F04C 29/04*** | (2006.01) |
| *F02B 53/00* | (2006.01) |

(52) U.S. Cl.

CPC .... *F04C 2240/801* (2013.01); *F05C 2201/90* (2013.01)

(56) References Cited

U.S. PATENT DOCUMENTS

| | | | | |
|---|---|---|---|---|
| 3,196,850 | A * | 7/1965 | Jones | F02B 55/12 418/101 |
| 3,833,321 | A | 9/1974 | Telang et al. | |
| 9,175,562 | B2 | 11/2015 | Casey | |
| 2018/0087394 | A1* | 3/2018 | Sarawate | F16J 15/0806 |
| 2020/0200009 | A1 | 6/2020 | Gagnon-Martin et al. | |
| 2022/0186621 | A1* | 6/2022 | Palumbo | F01D 5/3092 |

FOREIGN PATENT DOCUMENTS

| | | | |
|---|---|---|---|
| JP | S62096736 | A | 5/1987 |
| JP | H08158882 | A * | 6/1996 |

OTHER PUBLICATIONS

English Machine Translation of JPH08158882A via USPTO Fit Database (Year: 1996).*

Extended European Search Report for European Application No. 24162386.7 mailed Aug. 2, 2024.

* cited by examiner

ROTARY ENGINE SHIM DESIGN FOR FLOATING SIDE PLATES

TECHNICAL FIELD

The present disclosure relates generally to rotary engine and more specifically to a seal system for a combustion chamber of a rotary engine.

BACKGROUND

A rotary engine is an internal combustion engine with one or more rotating pistons. The piston rotates within a combustion chamber defined within a housing that includes features for supplying coolant flow along with the required air/fuel mixture and lubricant. The combustion chamber is defined between two end walls that are exposed to high temperatures and pressures. The high temperatures and pressures can present challenges to operational longevity and performance.

Engine manufacturers continue to seek further improvements to engine performance including improvements to thermal, transfer and propulsive efficiencies.

SUMMARY

A rotary internal combustion engine according to a disclosed example embodiment includes, among other possible things, a rotor housing having a peripheral wall circumscribing a rotor cavity, a rotor disposed within the rotor cavity, a side housing secured to the rotor housing, a plate defining a seal running surface for the rotor, the plate disposed between a portion of the side housing and the rotor housing, and at least one shim disposed between the plate and the side housing, the shim spacing the plate apart from contact with the side housing.

A rotary internal combustion engine according to another disclosed example embodiment includes, among other possible things, a rotor housing having a peripheral wall circumscribing a rotor cavity, a rotor disposed within the rotor cavity, a side housing secured to the rotor housing, a side plate disposed on an inner side of the side housing over the rotor cavity, the side plate defining a seal running surface for the rotor, and an outer shim disposed between the side plate and the side housing for spacing the side plate apart from contact with the side housing.

A method of assembling a rotary internal combustion engine according to another disclosed embodiment includes, among other possible things, placing an outer shim on a shoulder of a side housing, placing a side plate onto the outer shim such that the side plate is spaced apart from the shoulder of the side housing, and attaching the side housing to a rotor housing such that the side plate is disposed within a clearance space between a surface of the rotor housing and the outer shim.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
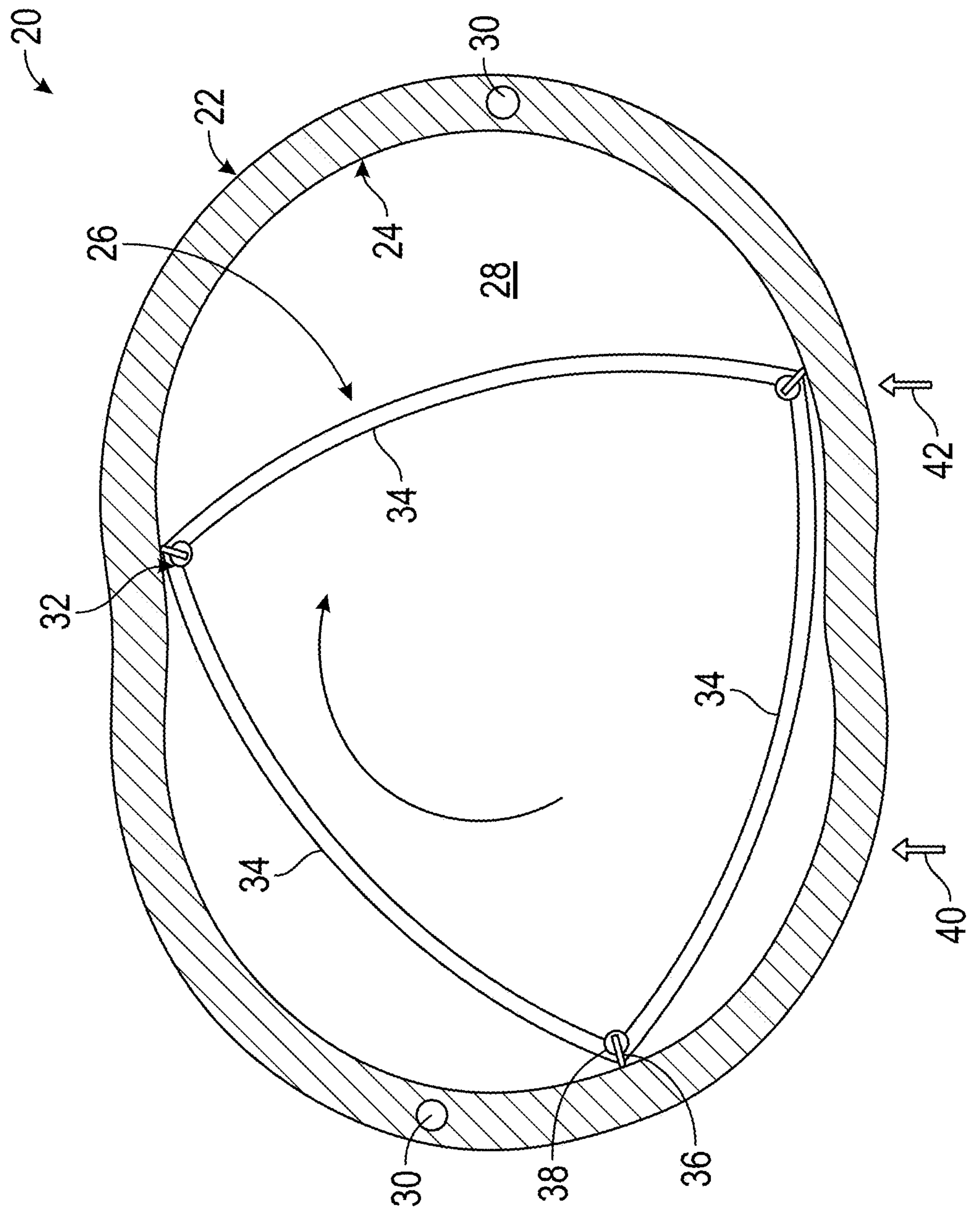
FIG. 1 is a schematic cross-sectional view of an example rotary engine embodiment.
Figure 2:
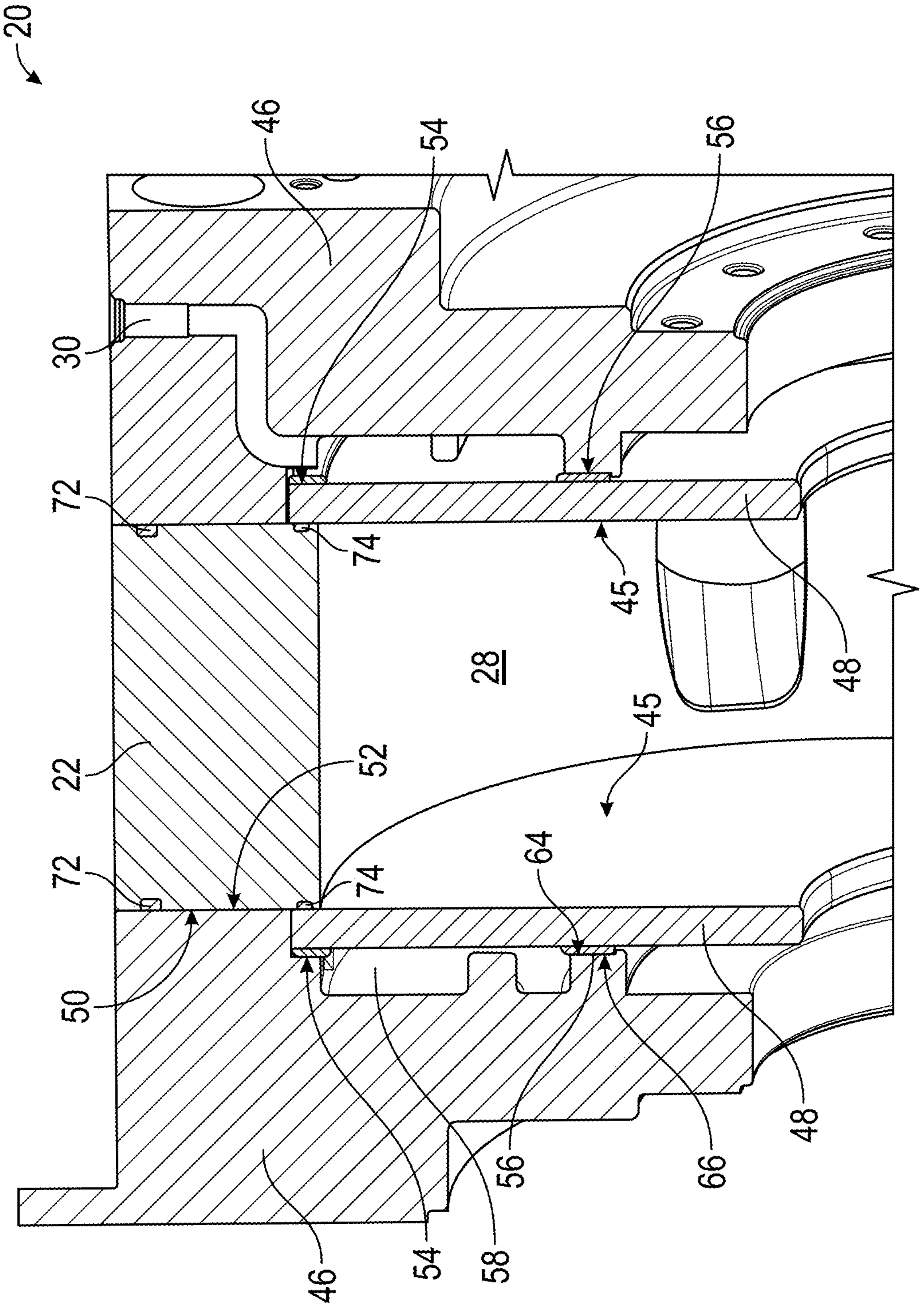
FIG. 2 is cross-sectional view of a portion of the example rotary engine embodiment.

Referring to FIGS. 1 and 2, a rotary internal combustion engine is schematically shown and indicated at 20. The example rotary internal combustion engine 20 is commonly referred to as a Wankel engine and includes a rotor 26 that rotates within a rotor cavity 28 defined by a peripheral wall 24 of a rotor housing 22. Coolant passages 30 are defined within the peripheral wall 24 for circulation of a cooling flow. An inlet 40 and exhaust 42 are indicated schematically and provide communication of fuel and exhaust gases with the rotor cavity 28.

The rotor 26 includes sides 34 that extend between three apex portions 32. An end seal 38 and apex seal 36 are disposed at each of the apex portions 32. The apex seal 36 provides for sealing against the peripheral wall 24 and the end seal 38 provides for sealing against a seal running surface 45 of a side plate 48 (FIG. 2). A side housing 46 is disposed on each side of the rotor housing 22 and supports a corresponding side plate 48 over the rotor cavity 28. The rotor housing 22 includes a housing face 50 that is transverse to the peripheral wall 24. Each of the side housings 46 include a sealing face 52 that seats and seals against the housing face 50. Seal 72 is disposed between the sealing face 52 and the housing face 50. A seal 74 is provided between the a seal running surface 45 of the side plate 48 and the housing face 50.

A corresponding one of the side plates 48 is held between a portion of the rotor housing 22 and the corresponding side housing 46. The side plates 48 are disposed within a clearance space between the rotor housing 22 and the side housing 46 in a manner such that the side plates 48 are not in contact with the side housing 46. The side plates 48 are spaced apart from the side housings 46 and are not clamped or otherwise in contact with the side housings 46.

Spacing the plates 48 away from the side housings 46 accommodates expansion during operation and prevents deterioration caused by contact. Accordingly, the side plates 48 may move within the space between the side housing 46 and the rotor housing 22. An outer shim 54 and an inner shim 56 are provided between the side plate 48 and the side housing 46 to space the side plate 48 from the side housing 46 and define a contact surface for the side plate 48.

Figure 3:
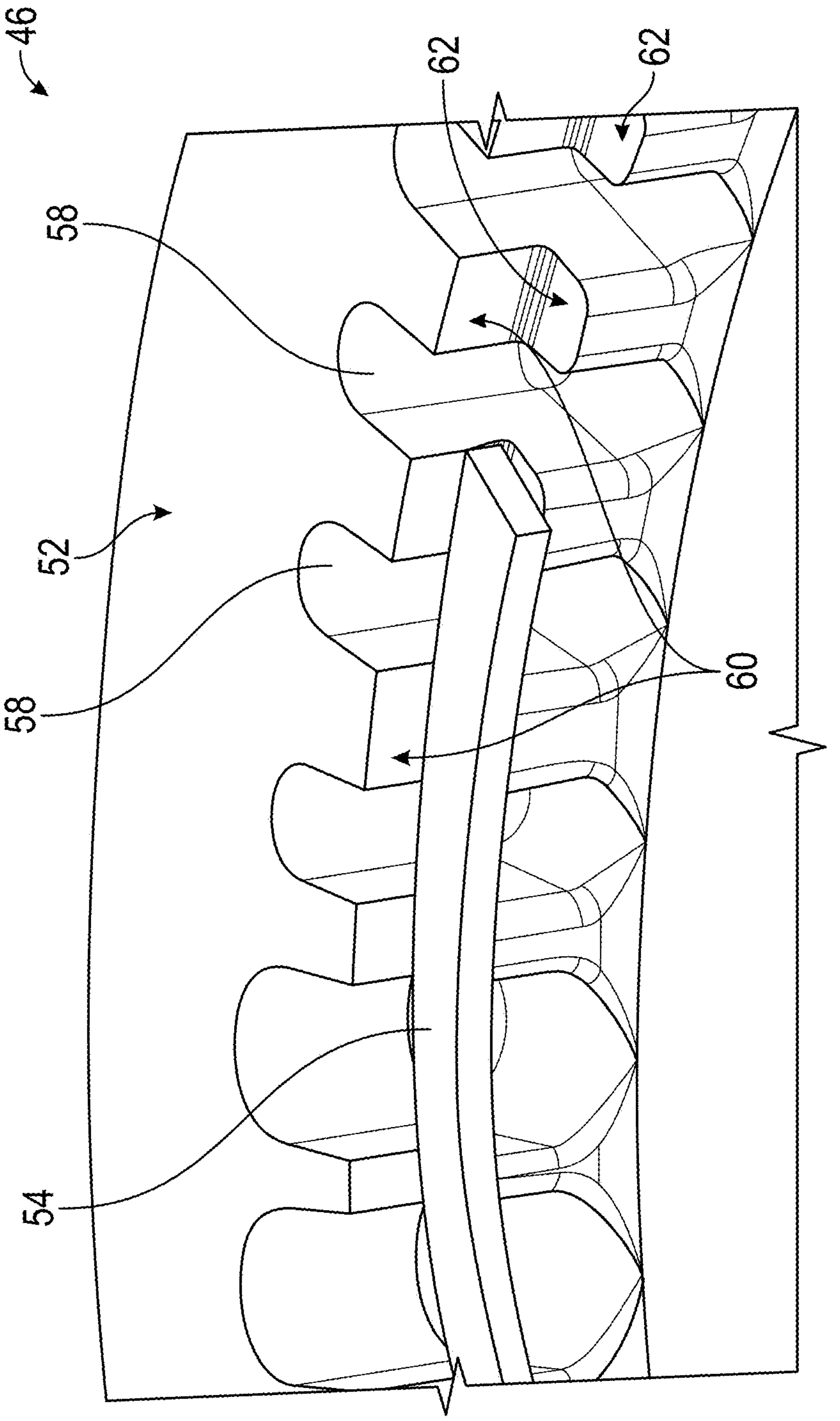
FIG. 3 is an enlarged perspective view of a portion of the example side housing.

Referring to FIG. 3 with continued reference to FIG. 2, the side housings 46 include an inner wall 60 that is transverse to the sealing face 52. A shoulder 62 projects outward from the inner wall 60 and provides a support surface of the side plates 48. In one disclosed example, the shoulder 62 and the inner wall 60 are interrupted by cooling channels 58. The interruption in the shoulder 62 reduces the area of the shoulder 62 in local areas. The reduction in area can increase localized contact pressure and stress concentrations experienced by the side plate 48.

The outer shim 54 is supported on the shoulder 62 and extends across the channels 58. The side plate 48 is supported on the outer shim 54 such that no part of the sealing surface 45 of the side plate 48 is in direct contact with the side housing 46. The outer shim 54 provides an increased contact area for the side plate 48 to reduce localized contact pressures and stress concentrations and thereby localized wear.

Although the shoulder 62 is shown as being interrupted by the cooling channels 58, it is within the contemplation of this disclosure that the shoulder 62 may be a continuous uninterrupted surface for the outer shim 54.

Figure 5:
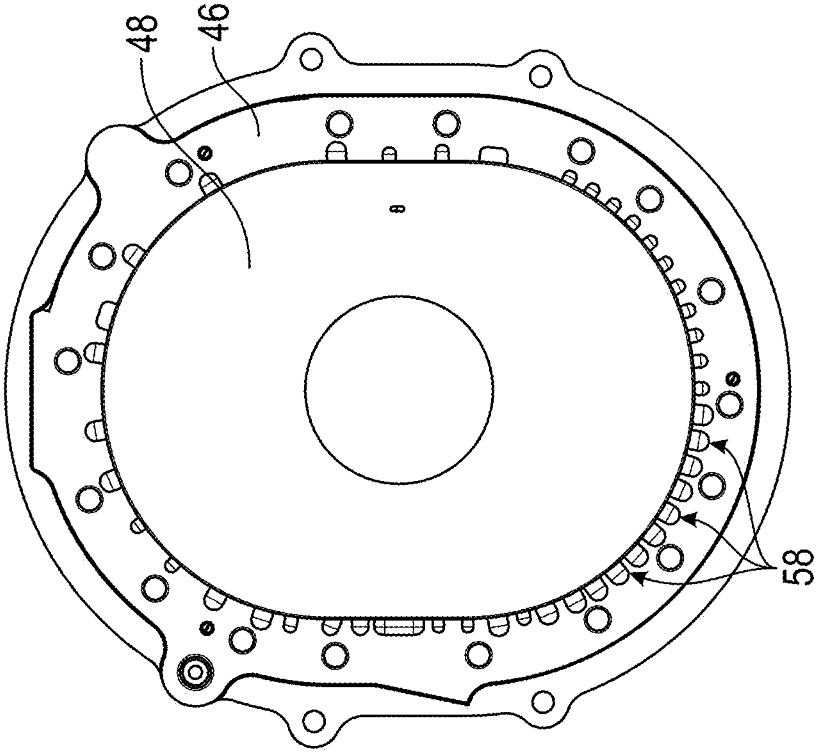
FIG. 5 is a side view of the example side housing and side plate embodiment.
Figure 4:
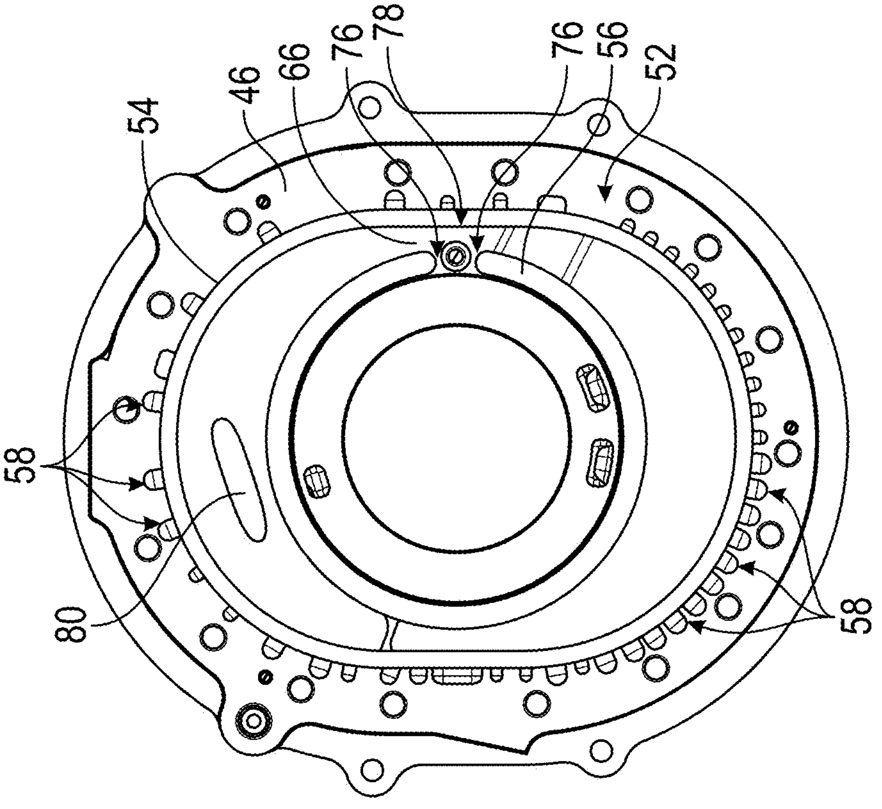
FIG. 4 is a side view of an example side housing embodiment.

Referring to FIGS. 4 and 5 with continued reference to FIGS. 2 and 3, the outer shim 54 extends about the inner wall 60 of the side housing 46 to provide a continuous seating surface for the side plate 48. An inner shim 56 is provided on a center sealing surface 64 of a center section 66. The inner shim 56 includes ends 76 on either side of a gap 78 in the center section 66. Both the inner shim 56 and the outer shim 54 support the side plate 48 in a spaced apart manner from surfaces of the side housing 22.

The example side housing 46 may include other structures between the inner and outer shims 54, 56, such as for example, a flow directing structure 80. Such structures are disposed at height below that of a top of the shims 54, 56 to prevent contact with the side plate 48. Although a single structure 80 is shown by way of example, other structures may be in the space between the shims 54, 56 and also would be configured to prevent contact with the side plate 48.

In one example embodiment, the side plates 48 are formed from a silicon carbide material and the side housings are formed from aluminum. The silicon carbide material provides desirable tribological characteristics for operation with the rotor 26. The outer shim 54 provides an increased robustness to the interface between the dissimilar materials of the side housing 46 and the side plates 48. In one example embodiment, the shims 54, 56 are formed from a Cobalt-chromium alloy.

In one example embodiment, the shims 54, 56 includes a profile surface roughness (Ra) below 32 Ra. It should be appreciated, that although a range of profile surface roughness is disclosed by way of example, other surface roughness may be utilized and are within the contemplation and scope of this disclosure.

Although a specific material is disclosed by way of example, other materials with desirable wear properties could be utilized for each of the side plate 48 and the shims 54, 56 and are within the contemplation and scope of this disclosure. Moreover, a coating may be utilized on either of the shims 54, 56 and the side plate 48 to further reduce wear and is within the scope and contemplation of this disclosure. While the disclosed example shims 54, 56 are formed of the same material, the different shims 54, 56 may be formed from different materials to tailor use to specific locations. Additionally, although two shims are disclosed by way of example, various numbers of shims could be utilized within the scope and contemplation of this disclosure. Furthermore, the shape of the shims may be different from the example embodiment and remain within the contemplation and scope of this disclosure.

The inner and outer shims 54, 56 are shown as separate parts that are assembled to different locations. However, the inner and outer shims 54, 56 may be arranged as one single shim and remain within the contemplation and scope of this disclosure.

Figure 6:
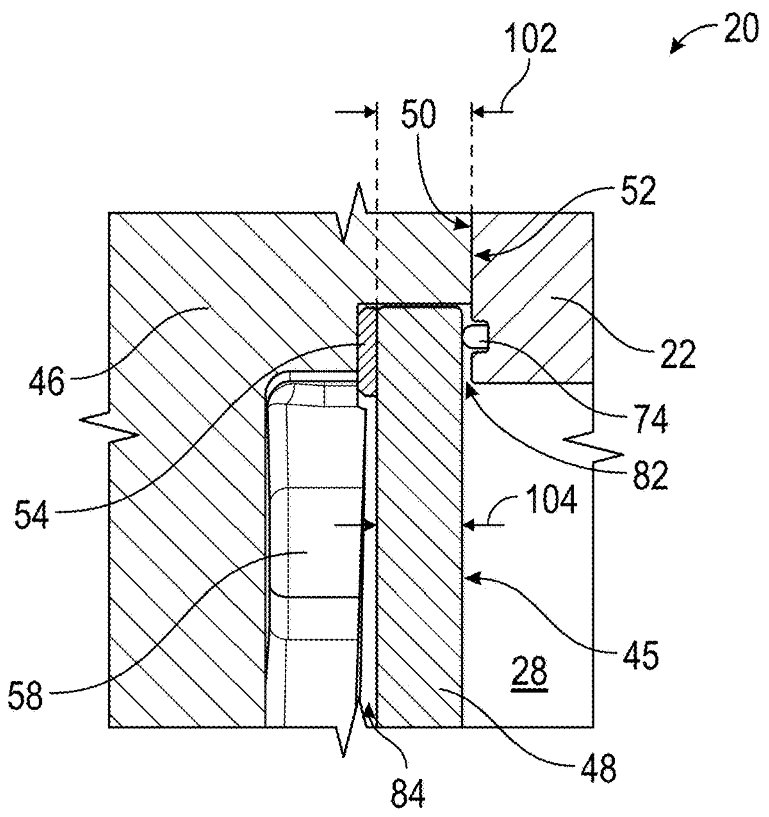
FIG. 6 is an enlarged cross-section of a side plate within a clearance space between a rotor housing and side housing.

Referring to FIG. 6, with continued reference to FIGS. 2 and 3, the side plates 48 are disposed within a clearance space 102 between the outer shim 54 and the housing face 50 of the rotor housing 22. FIG. 6 illustrates the side plate 48 in a position abutted against the outer shim 54. The outer shim 54 is shown by way of example and the same clearance configuration applies to gaps between the inner shim 56 and the side plate 48.

The side plate 48 includes a thickness 104 that is less than the clearance space 102 such that the side plate 48 may move to compensate for differences in material thermal expansions during operation. In the example shown in FIG. 6, the side plate 48 is seated on the outer shim 54 leaving a gap 82 between the seal surface 45 and the housing face 50. The seal 74 is arranged such that it compensates for movement of the side plate 48 and maintains sealing contact against the side plate 48. A gap 84 between the side plate 48 and a surface of the side housing 46 is also provided to assure that the seal plate 48 does not contact any surface of the side housing 46.

Figure 7:
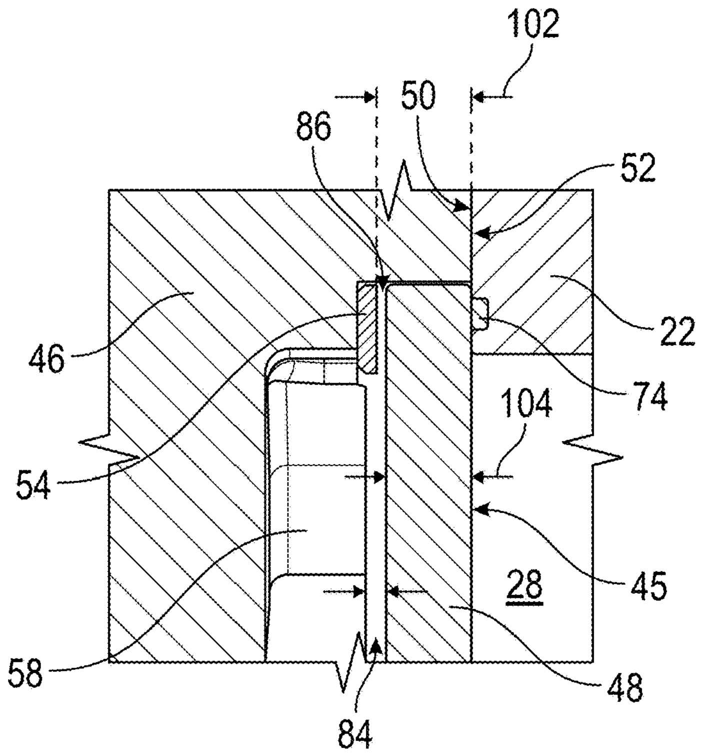
FIG. 7 is another enlarged cross-section of a side plate within a clearance space between a rotor housing and side housing.

Referring to FIG. 7, with continued reference to FIG. 6, the side plate 48 is shown abutted against the housing face 50 of the rotor housing 22. In this position, a gap 86 is present between the outer shim 54 and the side plate 48. The gap 84 is larger in the position shown in FIG. 7.

FIGS. 6 and 7 show the outer shim 54 in relation to the side plate 48 within the clearance space 102. Spacing at the inner shim 56 corresponds with that of the outer shim 54 as shown. In one example embodiment, the gaps 86 and 82 are between 0.001 inch and 0.010 inch (0.025 mm and 0.25 mm). In another example embodiment, the gaps 86 and 82 are between 0.001 inch and 0.006 inch (0.025 mm and 0.152 mm). The gap 84 varies based on a position of the side plate 48. In all conditions and positions of the side plate 48, the gap 84 provides a clearance between any portion of the side housing 46 and the side plate 48. It should be appreciated, that the gaps 86 and 82 may be different than the disclosed examples and remain within the contemplation and scope of this disclosure.

Figure 8:
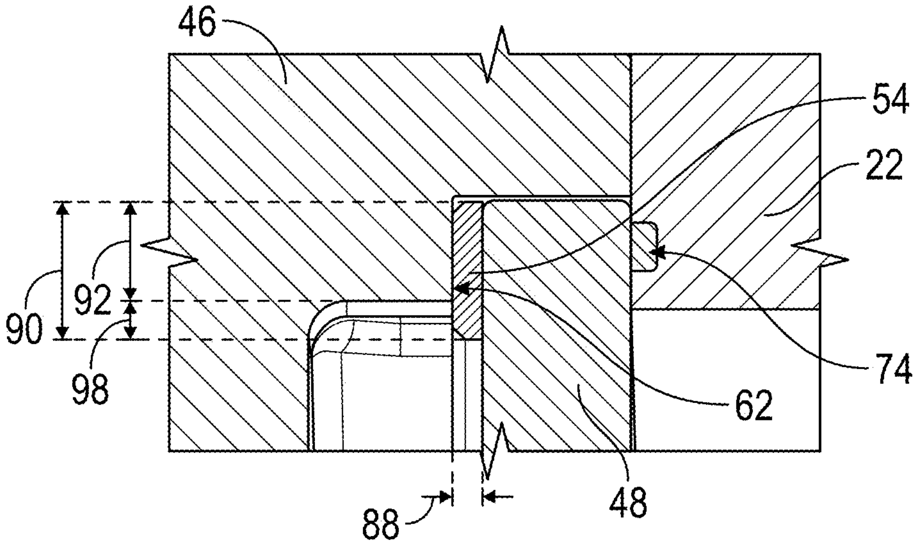
FIG. 8 is another enlarged cross-section of a portion of the example rotor housing, side housing and side plate.
Figure 9:
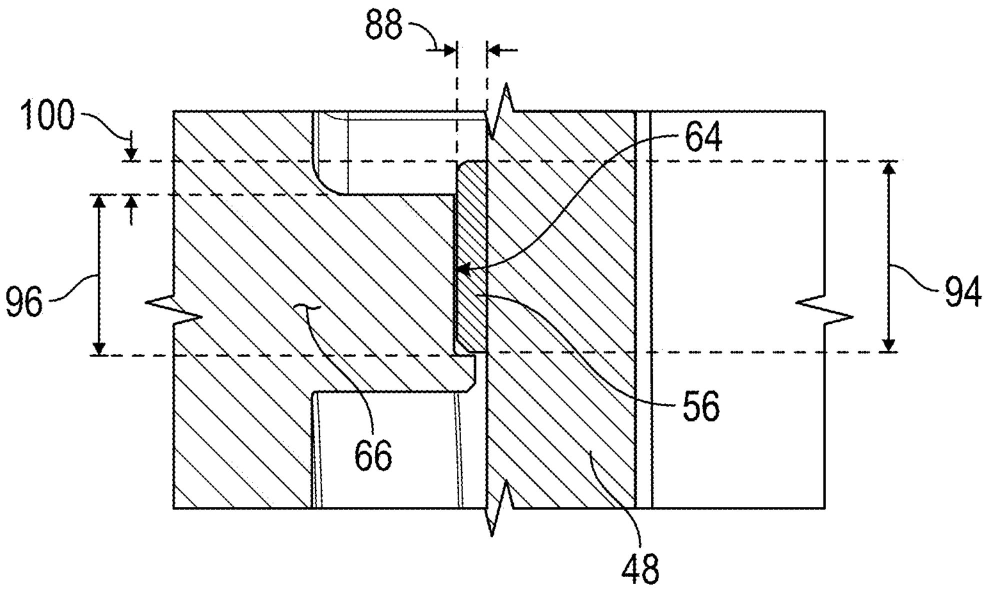
FIG. 9 is another enlarged cross-section of a portion of the example side housing and side plate.

Referring to FIGS. 8 and 9, the shims 54, 56 include a thickness and a width. In one example embodiment, the a thickness 88 of both the shims 54 and 56 are the same. In another example embodiment, one or both the shims 54, 56 is greater than a width of the corresponding support structure on which they are seated. Accordingly, a width of each of the shims 54, 56 may be different and tailored to the corresponding support surface.

In one example embodiment, the outer shim 54 is supported on the shoulder 62. The shoulder 62 includes a width 92 that is less than a width 90 of the outer shim 54. In another example embodiment, the center seating surface 64 includes a width 96 that is less than a width 94 of the inner shim 56. The increased width of each of the inner and outer shims 54, 56, provide a desired surface area for supporting the side plate 48.

In one example embodiment, the width 92 of the outer shim 54 is such that the outer shim 54 overhangs the shoulder 62 by an overhang width 98. In one example embodiment, the overhang width 98 is between 0.5 and 3.0 times the thickness 88 of the outer shim 54. In another example embodiment, the width 98 is between 1.0 and 2.0 times the thickness 88 of the outer shim 54.

In another example embodiment, the width 94 of the inner shim 56 extends beyond the seating surface by an overhang width 100. In one example embodiment, the overhang width 100 is between 0.5 and 3 times the thickness 88 of the inner shim 56. In another example embodiment, the width 98 is between 1.0 and 2.0 times the thickness 88 of the outer shim 54. The inner shim 56 and the outer shim 54 may have different widths and thereby different proportions relative to the corresponding seating surface 64 and shoulder 62. The overhang widths 98, 100 reduce edge loading on the shims 4, 56 and the plate 48.

A rotary internal combustion engine 20 according to one example embodiments includes, among other possible things, a rotor housing 22 having a peripheral wall 24 circumscribing a rotor cavity 28, a rotor 26 disposed within the rotor cavity 28, a side housing 46 secured to the rotor housing 22, a plate 48 defining a seal running surface 45 for the rotor 26, the plate 48 disposed between a portion of the side housing 46 and the rotor housing 22, and at least one shim 54, 56 disposed between the plate 48 and the side housing 46, the shim spacing the plate 48 apart from contact with the side housing 46.

In a further embodiment of the forgoing rotary internal combustion engine 20, the plate 48 is disposed within a clearance space 102 between the at least one shim 54, 56 and the rotor housing 22.

In a further embodiment of any of the forgoing rotary internal combustion engines 20, the side housing 46 includes a sealing face 52 that seats against a housing face 50 of the rotor housing 22, an inner wall 60 transverse to the sealing face 52 and a shoulder 62 extending inward from the inner wall 60, wherein the at least one shim 54, 56 is seated on the shoulder 62.

In a further embodiment of any of the forgoing rotary internal combustion engines 20, the at least one shim 54, 56 is uninterrupted about the inner peripheral wall 24.

In a further embodiment of any of the forgoing rotary internal combustion engines 20, the shoulder 62 includes a width 92 and the at least one shim 54 includes a width 90 that is greater than the width of the shoulder 62.

In a further embodiment of any of the forgoing rotary internal combustion engines 20, the side housing 46 includes at least one coolant channel 58 interrupting the inner wall 60 and the shoulder 62, wherein the at least one shim 54, 56 extends over the at least one coolant channel 58.

In a further embodiment of any of the forgoing rotary internal combustion engines 20, the side housing 46 includes a center seating surface 64 spaced inward of the inner wall 60 and the at least one shim 54, 56 comprises an outer shim 54 seated on the shoulder 62 and an inner shim 56 seated on the center seating surface 64.

In a further embodiment of any of the forgoing rotary internal combustion engines 20, the center seating surface 64 includes a gap 78 and the inner shim 56 includes a first end 76 spaced apart across the gap 78 from a second end 76.

In a further embodiment of any of the forgoing rotary internal combustion engines 20, the at least one shim 54, 56 includes a surface roughness that is less than 32 Ra.

In a further embodiment of any of the forgoing rotary internal combustion engines 20, the side housing 46 includes at least one structure 80 between the shoulder 62 and the center seating surface 64, the at least one structure 80 spaced apart from the side plate 48.

In a further embodiment of any of the forgoing rotary internal combustion engines 20, the at least one shim 54, 56 is formed from a cobalt-chromium alloy.

A rotary internal combustion engine according to another example embodiment includes, among other possible things, a rotor housing 22 having a peripheral wall 24 circumscribing a rotor cavity 28, a rotor 26 disposed within the rotor cavity 28, a side housing 46 secured to the rotor housing 22, a side plate 48 disposed on an inner side of the side housing 46 over the rotor cavity 28, the side plate 48 defining a seal running surface for the rotor 26, and an outer shim disposed between the side plate 48 and the side housing 46 for spacing the side plate 48 apart from contact with the side housing 46.

In a further embodiment of the forgoing rotary internal combustion engines 20, the side housing 46 includes a center seating surface 64 with an inner shim 56 disposed between the center seating surface 64 and the side plate 48.

In a further embodiment of any of the forgoing rotary internal combustion engines 20, the side housing 46 includes a shoulder 62 extending inward from an inner wall 60 with the outer shim seated on the shoulder 62.

In a further embodiment of any of the forgoing rotary internal combustion engines 20, the side housing 46 includes a plurality of cooling channels 58 that extend inwardly through the shoulder 62 and the inner wall 60 and the outer shim 54 extends over each of the plurality of cooling channels 58.

In a further embodiment of any of the forgoing rotary internal combustion engines 20, the side housing 46 includes at least one structure 80 disposed between the inner wall 60 and the center seating surface 64, wherein the at least one structure 80 includes a top surface that is spaced apart from the side plate 48 when the side plate 48 is seated on the inner shim 56 and the outer shim 54.

In a further embodiment of any of the forgoing rotary internal combustion engines 20, the plurality of cooling channels 58 are disposed at varying intervals about the inner wall 60 of the side housing 46.

A method of assembling a rotary internal combustion engine according to another example embodiment includes, among other possible things, placing an outer shim on a shoulder 62 of a side housing 46, placing a side plate 48 onto the outer shim such that the side plate 48 is spaced apart from the shoulder 62 of the side housing 46, and attaching the side housing 46 to a rotor housing 22 such that the side plate 48 is disposed within a clearance space 102 between a surface of the rotor housing 22 and the outer shim 54.

In a further embodiment of the foregoing method, the side housing 46 includes a center seating surface 64 and assembly further includes placing an inner shim 56 on the center seating surface 64 and placing the side plate 48 includes placing the side plate 48 on the inner shim 56 and the outer shim 54.

In a further embodiment of any of the foregoing methods, placing the outer shim 54 further comprises placing the outer shim 54 across at least one coolant channel 58.

Accordingly, the disclosed shims prevent and/or reduce wear on side plates of a rotary engine to improve operational longevity.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A rotary internal combustion engine comprising:

a rotor housing having a peripheral wall circumscribing a rotor cavity;

a rotor disposed within the rotor cavity;

a side housing secured to the rotor housing, the side housing includes a sealing face that seats against a housing face of the rotor housing, an inner wall transverse to the sealing face and a shoulder extending inward from the inner wall;

a plate defining a seal running surface for the rotor, the plate disposed between a portion of the side housing and the rotor housing; and at least one shim disposed between the plate and the side housing, the shim spacing the plate apart from contact with the side housing, wherein the plate is disposed within a clearance space between the at least one shim and the rotor housing, the at least one shim is seated on the shoulder, the shoulder includes a width and the at least one shim includes a width that is greater than the width of the shoulder.

2. The rotary internal combustion engine as recited in claim 1, wherein the at least one shim is uninterrupted about the inner wall.

3. The rotary internal combustion engine as recited in claim 1, wherein the side housing includes at least one coolant channel interrupting the inner wall and the shoulder, wherein the at least one shim extends over the at least one coolant channel.

4. The rotary internal combustion engine as recited in claim 3, wherein the side housing includes a center seating surface spaced inward of the inner wall and the at least one shim comprises an outer shim seated on the shoulder and an inner shim seated on the center seating surface.

5. The rotary internal combustion engine as recited in claim 1, wherein the at least one shim includes a surface roughness that is less than 32 Ra.

6. The rotary internal combustion engine as recited in claim 1, wherein the at least one shim is formed from a cobalt-chromium alloy.

7. A rotary internal combustion engine comprising:

a rotor housing having a peripheral wall circumscribing a rotor cavity;

a rotor disposed within the rotor cavity;

a side housing secured to the rotor housing, wherein the side housing includes a sealing face that seats against a housing face of the rotor housing, an inner wall transverse to the sealing face, a shoulder extending inward from the inner wall, at least one coolant channel interrupting the inner wall and the shoulder, and a center seating surface spaced inward of the inner wall;

a plate defining a seal running surface for the rotor, the plate disposed between a portion of the side housing and the rotor housing; and at least one shim disposed between the plate and the side housing, the shim spacing the plate apart from contact with the side housing, wherein the plate is disposed within a clearance space between the at least one shim and the rotor housing, the at least one shim is seated on the shoulder and comprises an outer shim seated on the shoulder and an inner shim seated on the center seating surface and extends over the at least one coolant channel, wherein the center seating surface includes a gap and the inner shim includes a first end spaced apart across the gap from a second end.

8. The rotary internal combustion engine as recited in claim 7, wherein the side housing includes at least one structure between the shoulder and the center seating surface, the at least one structure spaced apart from the side plate.

9. A rotary internal combustion engine comprising:

a rotor housing having a peripheral wall circumscribing a rotor cavity and a housing face;

a rotor disposed within the rotor cavity;

a side housing secured to the rotor housing, the side housing including a sealing face that seals against the housing face, wherein the rotor housing includes a shoulder extending inward from an inner wall;

a side plate disposed on an inner side of the side housing over the rotor cavity, the side plate defining a seal running surface for the rotor; and an outer shim disposed between the side plate and the side housing for spacing the side plate apart from contact with the side housing, wherein the side plate is disposed within a clearance space between the outer shim and the rotor housing, and the outer shim is seated on the shoulder and includes a width that is greater than a width of the shoulder of the side housing.

10. The rotary internal combustion engine as recited in claim 9, wherein the side housing includes a center seating surface with an inner shim disposed between the center seating surface and the side plate.

11. The rotary internal combustion engine as recited in claim 10, wherein the side housing includes a plurality of cooling channels that extend inwardly through the shoulder and the inner wall and the outer shim extends over each of the plurality of cooling channels.

12. The rotary internal combustion engine as recited in claim 11, wherein the side housing includes at least one structure disposed between the inner wall and the center seating surface, wherein the at least one structure includes a top surface that is spaced apart from the side plate when the side plate is seated on the inner shim and the outer shim.

13. The rotary internal combustion engine as recited in claim 11, wherein the plurality of cooling channels are disposed at varying intervals about the inner wall of the side housing.

14. A method of assembling a rotary internal combustion engine comprising:

placing an outer shim on a shoulder of a side housing;

placing a side plate onto the outer shim such that the side plate is spaced apart from the shoulder of the side housing; and attaching the side housing to a rotor housing such that the side plate is disposed within a clearance space between a surface of the rotor housing and the outer shim, wherein the side housing includes a center seating surface and assembly further includes placing an inner shim on the center seating surface and placing the side plate includes placing the side plate on the inner shim and the outer shim.

15. The method as recited in claim 14, wherein placing the outer shim further comprises placing the outer shim across at least one coolant channel.

* * * * *